July 3, 1962
A. J. BLISS
3,042,394
REAR SPRING BUSHING
Filed Feb. 29, 1960
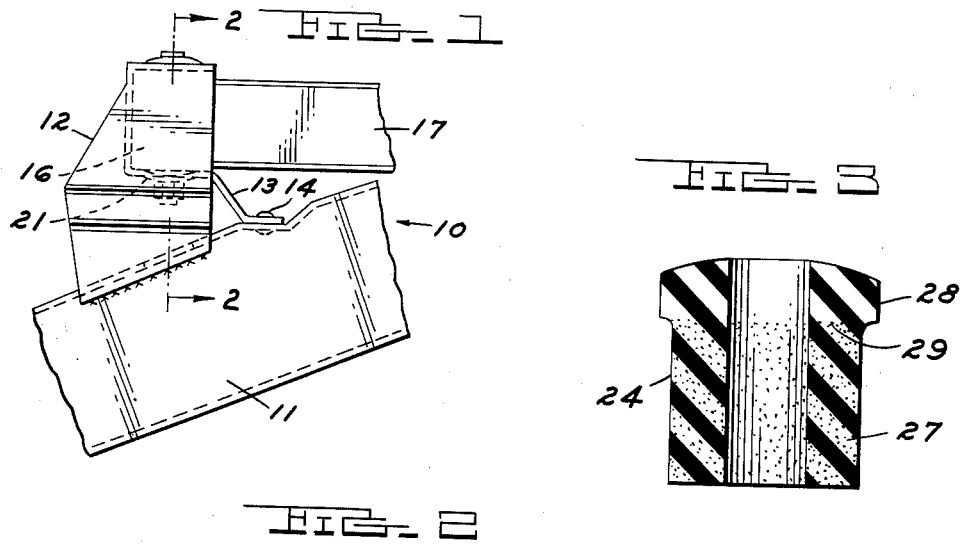
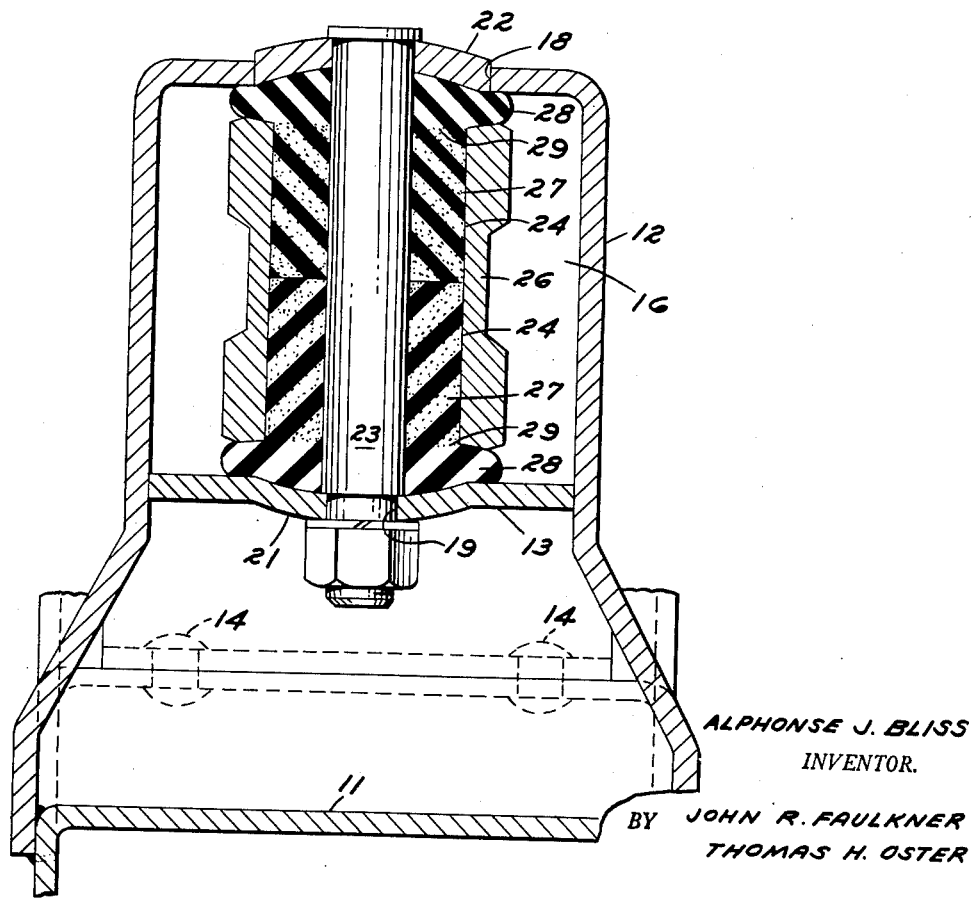
ALPHONSE J. BLISS
INVENTOR.
BY JOHN R. FAULKNER
THOMAS H. OSTER
ATTORNEYS 3,042,394
REAR SPRING BUSHING
Alphonse J. Bliss, Dearborn, Mich., assignor to Ford Motor Company, Dearborn, Mich., a corporation of Delaware
Filed Feb. 29, 1960, Ser. No. 11,795
1 Claim. (Cl. 267—54)

This invention relates to a cushioning element and more particularly to a bushing formed of an elastomer which has a dual durometer hardness construction.

Bushings of this type may be effectively used in a motor vehicle rear spring front shackle in which the body portion of the bushing is made from an elastomer of a specified durometer hardness for controlling harshness and/or wheel recession and the flange portion of the same bushing is made from an elastomer of a different durometer hardness to control the lateral restriction of the vehicle.

Prior to this invention, it was common practice to provide bushings of a single durometer hardness for use in the rear spring shackle construction of the motor vehicle. If the bushing durometer hardness was ideal in road harshness control and in the amount of axle noise normally transmitted from the rear suspension to the frame and body, it was usually too soft to provide the ideal lateral stability. The durometer hardness selected ultimately was either a less than ideal compromise to take care of both lateral restrictions and road harshness and/or an emphasis on one condition over the other.

In some instances multiple piece bushings were used in which different durometer hardnesses were provided in the areas requiring different resilient properties. This type of construction results in a substantial increase in parts to be used and handled, assembly time required to put the parts together, part storage requirements and an increase in tooling cost.

In the present construction the bushing is made of a single piece construction in which the flange area is of one durometer hardness while the body area is of another durometer. In the example bushing shown, the Shore A durometer test equipment was used. It has been found in practice that the 70 durometer hardness flange area is ideal in providing for lateral restriction and good steering, while a 50 durometer hardness body is ideal in reducing to an acceptable value road harshness and axle noise normally transmitted from the vehicle suspension to the frame and body. Obviously, this invention is capable of utilizing any variety of durometer hardnesses.

The one piece dual durometer hardness bushing is readily accommodated in the vehicle assembly without incurring additional assembly cost penalties over the single durometer hardness bushing and at a reduction in cost over the multiple piece bushings. Furthermore, an ideal control is possible over two distinct vehicle operations without comprising either one or both of the vehicle operations.

Other objects and advantages will become more apparent when considered in connection with the accompanying drawings, wherein:

FIGURE 1 is a fragmentary plan view of a frame and rear spring attachment embodying the invention.

FIGURE 2 is an enlarged cross sectional view taken on the plane indicated as line 2—2 of FIGURE 1.

FIGURE 3 is a longitudinal cross sectional view of a bushing made in accordance with the invention and illustrates the shape of the bushing prior to assembly in the motor vehicle.

Referring now to the drawings in detail:

In FIGURE 1, a section of the frame and assembled rear spring front shackle arrangement is indicated generally at 10. A shackle support 12 is welded to the top and bottom of the frame, indicated at 11, and has a bent lip portion 13 which is secured to the side of frame by rivets 14 to form a box-like chamber 16 for the attachment of the front portion of the leaf spring 17.

Referring now to FIGURE 2, support 12 is provided with oppositely disposed, and transversely aligned with respect to the vehicle, enlarged aperture 18 and smaller aperture 19. Aperture 19 is centrally located in bulge 21 for a purpose to be described later. A concave centrally apertured washer 22 fits the enlarged aperture 18. Bolt 23 extends through the aperture 19 and the washer 22 for the purpose of supporting a pair of elastomer bushings 24 confined in edge abutting relationship within the eye 26 of the leaf spring 27.

Bushings 24 are each provided with cylindrical body portions 27 which are confined within the eye 26 and radially extending flange portions 28 which are located outside of the eye 26. Flange portions 28 are disposed between the washer 22 and the bulge 21 and upon assembly are distorted to conform to these shapes.

Bushing 24, which is shown in the unassembled condition in FIGURE 3, has dual durometer hardnesses as measured by the Shore A test equipment. Body portion 27 is made from an elastomer of a 50 durometer hardness while flange portion 28 is made from an elastomer of 70 durometer hardness. In the particular vehicles tested, the 50 durometer hardness body material reduced to an acceptable value the amount of road harshness and axle noise normally transmitted from the rear suspension to the frame and body. The 70 durometer hardness flange provides the necessary lateral restriction and reduction in vehicle shake characteristics without interfering with the function of the bushing body 23.

The dual durometer hardness bushing may be manufactured by providing a mold for the entire bushing. The 50 durometer hardness body portion is first extruded in the uncured state to fill the part of the mold cavity corresponding to its configuration. While the body portion is still in the uncured state, the 70 durometer hardness uncured flange portion is then extruded into the remaining portion of the die. Upon the completion of the curing cycle, the two different durometer hardness bushing portions are fused together about an area indicated generally at 29. Area 29 will have a mixture of the two different durometer hardness materials thereby resulting in a durometer hardness value somewhere between the hardness of the body portion and the flange portion. Because the fusion is complete, the bushings have withstood many hours of testing without rupturing at the point of fusion.

Although the invention has been described in connection with an automotive suspension bushing use, there are many other uses to which this novel construction may be put.

It will also be understood that the invention is not to be limited to the exact construction shown and described, but that various changes and modifications may be made without departing from the spirit and scope of the invention as defined in the appended claim.

What I claim is:

In a vehicle suspension system, a support member, a suspension member pivotally mounted upon said support member, one of said members including a pivot shaft and a pair of spaced axially abutments and the other of said members including a cylindrical sleeve concentrically surrounding said pivot shaft between said abutments, and a pair of elastomer bushings insulating said shaft and said sleeve from each other, each of said bushings comprising a one-piece non-reinforced resilient element having a relatively soft annular body portion positioned between said shaft and said sleeve to provide a high degree of relative movement therebetween in a radial direction during vehicle operation to dampen vibrations and harshness resulting from road irregularities, each of said bushings also having an integral flange portion at one end thereof projecting radially outwardly beyond the periphery of said body portion and positioned between one end of said sleeve and the adjacent abutment, said flange being relatively hard and having a durometer hardness value considerably higher than the hardness value of said body portion to resist relative movement between said support member and said suspension member in an axially direction to provide lateral stability for said vehicle, each of said bushings having an intermediate fused area of progressively changing durometer hardness between the low durometer body portion and the high durometer flange portion.

References Cited in the file of this patent

UNITED STATES PATENTS

| | | |
|---|---|---|
| 1,794,926 | Short | Mar. 3, 1931 |
| 2,037,033 | Lord | Apr. 14, 1936 |
| 2,043,015 | Shutts | June 2, 1936 |
| 2,275,081 | Maynard | Mar. 3, 1942 |
| 2,833,535 | Blythe | May 6, 1958 |

FOREIGN PATENTS

| | | |
|---|---|---|
| 457,576 | Great Britain | Dec. 1, 1936 |
| 945,610 | Germany | July 12, 1956 |